(12) United States Patent
Miller (10) Patent No.: US 6,460,132 B1
(45) Date of Patent: Oct. 1, 2002

(54) MASSIVELY PARALLEL INSTRUCTION PREDECODING

(75) Inventor: Paul K. Miller, Dripping Springs, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/387,024

(22) Filed: Aug. 31, 1999

(51) Int. Cl.[7] .............................................. G06F 11/00
(52) U.S. Cl. ..................................................... 712/213
(58) Field of Search ................................ 712/213, 200, 712/204, 208, 209, 210, 211, 212

(56) References Cited

U.S. PATENT DOCUMENTS

| | | | |
|---|---|---|---|
| 5,337,415 A | * 8/1994 | Delano | 712/213 |
| 5,586,277 A | 12/1996 | Brown et al. | 712/210 |
| 5,619,666 A | 4/1997 | Coon et al. | 712/208 |
| 5,630,083 A | 5/1997 | Carbine et al. | 712/212 |
| 5,809,273 A | 9/1998 | Favor et al. | 712/210 |
| 5,819,059 A | 10/1998 | Tran | 712/213 |
| 5,822,558 A | 10/1998 | Tran | 712/213 |
| 5,850,532 A | * 12/1998 | Narayan | 712/213 |
| 5,941,980 A | * 8/1999 | Shang | 712/204 |
| 5,970,235 A | * 10/1999 | Witt | 712/213 |
| 6,092,182 A | * 7/2000 | Mahalingaiah | 712/213 |
| 6,122,729 A | * 9/2000 | Tran | 712/244 |

FOREIGN PATENT DOCUMENTS

EP 0 417 013 3/1991

OTHER PUBLICATIONS

Gwennap, "Intel, HP Make EPIC Disclosure," Microprocessor Report, vol. 11, No.14, Oct. 1997, 2 pages.
Gwennap, "First Merced Patent Surfaces," Microprocessor Report, Mar. 1997, 3 pages.
Christy, "IA–64 and Merced—What and Why," Cahners Electronics Group, 1997, 5 pages.

* cited by examiner

Primary Examiner—Eric Coleman
(74) Attorney, Agent, or Firm—Conley, Rose & Tayon PC; B. Noël Kivlin (57) ABSTRACT

A microprocessor configured to predecode variable length instructions in a massively parallel fashion is disclosed. The microprocessor may comprise a prefetch fetch unit configured to read instruction bytes from memory and a plurality of predecode unit configured to receive and predecode the instruction bytes. The predecode units are configured to operate separately and in parallel to generate one or more predecode bits per instruction byte. The microprocessor may further include a predecode bit correction unit configured to receive, verify, and correct the predecode bits from the parallel predecode units. A computer system and method for predecoding instructions are also disclosed.

20 Claims, 7 Drawing Sheets

MASSIVELY PARALLEL INSTRUCTION PREDECODING

BACKGROUND OF THE INVENTION

1. Field of the Invention

This invention relates to microprocessors configured to execute variable-length instruction sets, and in particular, instruction predecoders configured to predecode multiple instruction in parallel.

2. Description of the Relevant Art

The number of software applications written for the x86 instruction set is immense. As a result, despite the introduction of newer and more advanced instruction sets, microprocessor designers have continued to design microprocessors capable of executing the x86 instruction set.

Figure 1:
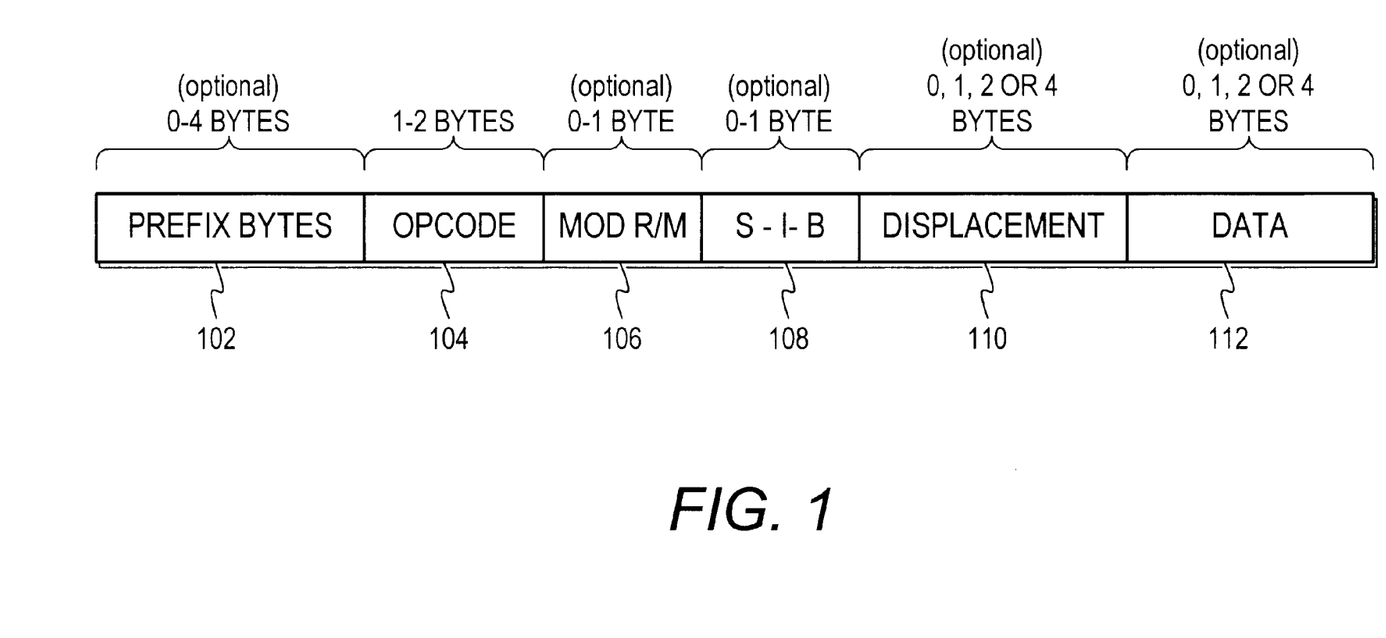
FIG. 1 is a block diagram illustrating the generic format of the x86 instruction set.

The x86 instruction set is relatively complex and is characterized by a plurality of variable-length instructions. This is in stark contrast with many RISC (reduced instruction set computer) formats which are fixed-length. A generic format illustrative of the x86 instruction set is shown in FIG. 1. As the figure illustrates, an x86 instruction consists of from one to five optional prefix bytes 102, followed by an operation code (opcode) field 104, an optional addressing mode (Mod R/M) byte 106, an optional scale-index-base (SIB) byte 108, an optional displacement field 110, and an optional immediate data field 112.

The opcode field 104 defines the basic operation for a particular instruction. The default operation of a particular opcode may be modified by one or more of the optional prefix bytes 102. For example, one of prefix bytes 102 may be used to override the default segment used in memory addressing or to instruct the processor to repeat a string operation a number of times.

Two prefix bytes are of particular importance. A prefix byte of 66(hex) represents the OPSIZ prefix, which reverses the default the operand size for an instruction. A prefix byte of 67(hex) represents the ADRSIZ prefix, which reverses the default the address size for an instruction. The default operand and address size of an instruction is determined by a bit (i.e., the D-bit or default bit) in the segment descriptor. If the default bit is set, then the default address and operand size is 32-bits. A prefix of 66(hex) or 67(hex) will override a set default bit, thereby allowing the instruction following the prefix to use a 16-bit opcode or address, respectively. Similarly, if the default bit is not set, then the default address and operand size is 16-bits. A prefix of 66(hex) or 67(hex) will override a set default bit, thereby allowing the instruction following the prefix to use a 32-bit opcode or address, respectively. Thus, not only does the length of an x86 instruction depend upon how many prefix bytes precede the instruction, but also upon the presence of prefixes 66(hex), 67(hex), and the value of the default bit in the instruction's segment descriptor.

The opcode field 104 follows prefix bytes 102, if present, and may be one or two bytes in length. The addressing mode (Mod R/M) byte 106 specifies the registers used as well as memory addressing modes. The scale-index-base (SIB) byte 108 is used only in 32-bit base-relative addressing using scale and index factors. A base field within SIB byte 108 specifies which register contains the base value for the address calculation, and an index field within SIB byte 108 specifies which register contains the index value. A scale field within SIB byte 108 specifies the power of two by which the index value will be multiplied before being added, along with any displacement, to the base value. The next instruction field is a displacement field 110, which is optional and may be from one to four bytes in length. Displacement field 110 contains a constant used in address calculations. The optional immediate field 112, which may also be from one to four bytes in length, contains a constant used as an instruction operand. The shortest x86 instructions are only one byte long, and comprise a single opcode byte. The 80286 sets a maximum length for an instruction at 10 bytes, while the 80386 and 80486 both allow instruction lengths of up to 15 bytes.

The complexity of the x86 instruction set poses many difficulties in implementing high performance x86-compatible microprocessors. In particular, the variable length of x86 instructions, the nature of the prefix bytes, and reliance upon the segment descriptor makes scanning, aligning, and decoding instructions difficult. Scanning refers to reading a group of instruction bytes (either from an instruction cache within the microprocessor or from an external memory) and determining the boundaries of instructions contained therein. Alignment refers to the process of masking off the undesired instruction bytes and shifting the desired instruction so that the first bit of the desired instruction is in the desired position. Decoding instructions typically involves identifying each field within a particular instruction, e.g., the opcode and operand fields. Decoding typically takes place after the instruction has been fetched from the instruction cache, scanned, and aligned.

One method for determining the boundaries of instructions involves generating a number of predecode bits for each instruction byte read from main memory. The process of generating these predecode bits is referred to as "predecoding". The predecode bits provide information about the instruction byte they are associated with. For example, an asserted predecode start bit indicates that the associated instruction byte is the first byte of an instruction. Similarly, an asserted predecode end bit indicates that the associated instruction byte is the last byte of an instruction. Once the predecode bits for a particular instruction byte are calculated, they are stored together with the instruction byte in an instruction cache. When a "fetch" is performed, i.e., a number of instruction bytes are read from the instruction cache, the associated start and end bits are also read. The start and end bits may then be used to generate valid masks for the individual instructions with the fetch. A valid mask is a series of bits in which each bit corresponds to a particular instruction byte. Valid mask bits associated with the first byte of an instruction, the last byte of the instruction, and all bytes in between the first and last bytes of the instruction are asserted. All other valid mask bits are not asserted.

Figure 2:
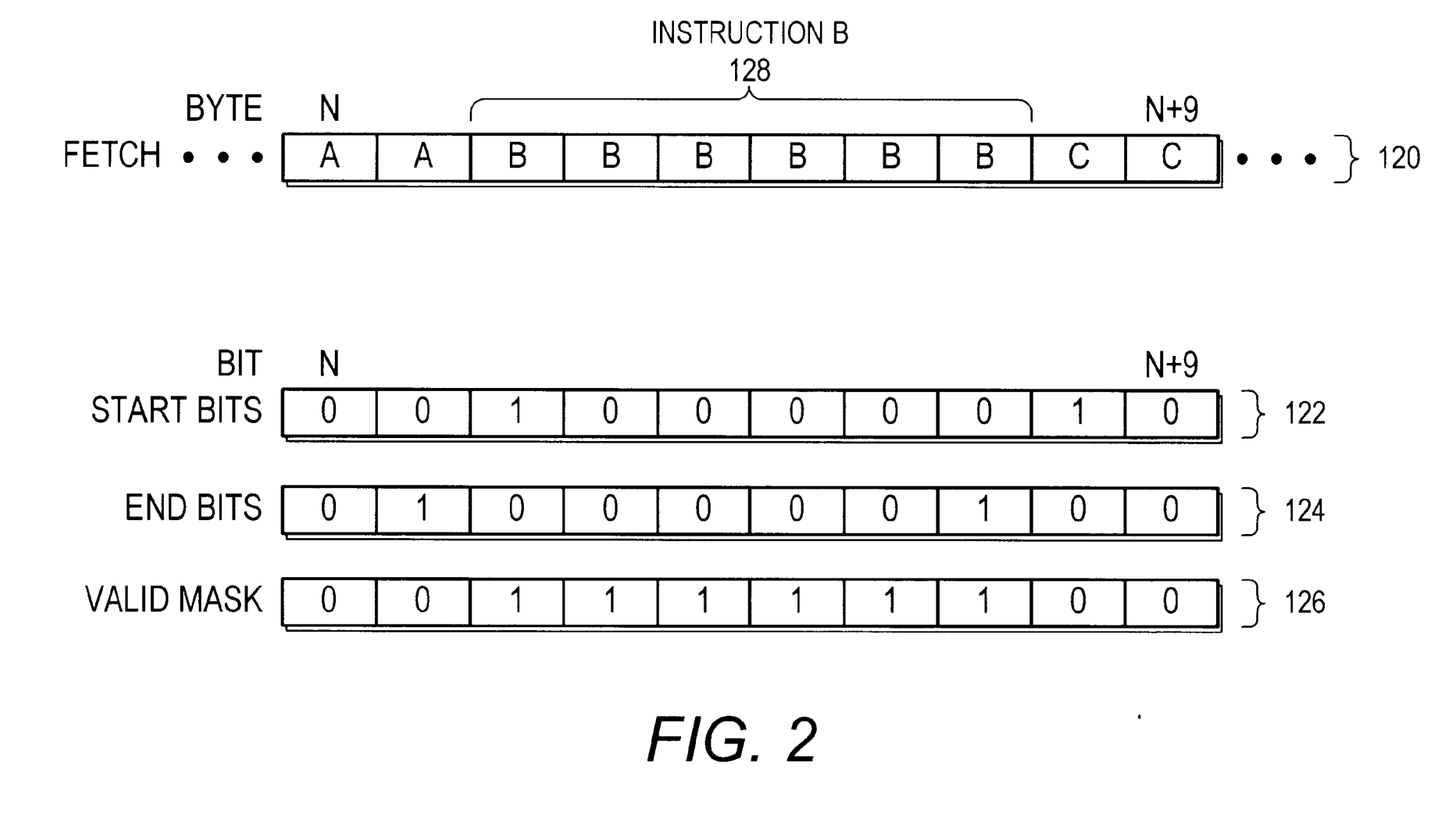
FIG. 2 is a block diagram illustrating one embodiment of a valid mask.

Turning now to FIG. 2, an exemplary valid mask is shown. The figure illustrates a portion of a fetch block 120 and its associated start and end bits 122 and 124. Assuming a valid mask 126 for instruction B 128 is to be generated, start and end bits 122 and 124 would be used to generate the mask. Valid mask 126 could then be used to mask off all bytes within fetch 120 that are not part of instruction B 128. Once the boundaries of an instruction have been determined, alignment and decoding may be performed.

Although the predecoding technique described above have been largely successful, it may pose a potential bottleneck to performance in the future as clock frequencies increase and as the number of instructions a microprocessor is capable of executing in a clock cycle increases. For this reason, a method and apparatus for rapidly predecoding a large number of instruction bytes in parallel is desired.

SUMMARY OF THE INVENTION

The problems outlined above may in part be solved by a microprocessor capable of predecoding a large number of instruction bytes in parallel. This may be accomplished through the use of multiple separate predecode units configured to operate in parallel. For example, while a traditional predecode unit may predecode four bytes per clock cycle, four predecode units may utilized in parallel to rapidly decode sixteen bytes per clock cycle. Advantageously, massively parallel predecoding of variable length instructions (e.g., x86 instructions) may improve predecode times.

In one embodiment, a microprocessor configured to predecode instruction bytes in a massively parallel fashion may include a prefetch unit, a plurality of predecode units, and a predecode bit correction unit. The prefetch unit is configured to receive a plurality of instruction bytes from a main memory subsystem in response to outputting a prefetch address. The plurality of predecode units are coupled to receive at least a portion of the prefetch address and a plurality of instruction bytes from the prefetch unit. Each individual predecode unit is configured to operate on a plurality of instruction bytes independently and in parallel with the other predecode units to generate one or more predecode bits per instruction byte. The predecode bit correction unit is coupled to receive the prefetch address, the instructions bytes from the prefetch unit, and the predecode bits from the plurality of predecode units. The correction unit is configured to verify and correct the predecode bits generated by the plurality of predecode units.

A method for predecoding instructions having varying address and operand sizes is also contemplated. In one embodiment the method includes reading a plurality of instruction bytes from a main memory subsystem. The plurality of instruction bytes are divided into a plurality of subsets, and each subset is distributed among a plurality of predecode units. Each predecode unit processes the subset it has received by generating at least one predecode bit for each instruction byte and outputting the predecode bits to a predecode bit correction unit. The predecode bit correction unit is configured to verify the accuracy of the predecode bits and correcting any predecode bits that are incorrect.

A computer system capable of rapidly predecoding a large number of instructions bytes is also contemplated. The computer system may comprise a microprocessor as described above, a CPU bus coupled to the microprocessor; and a communications device (e.g., a modem) coupled to the microprocessor via the CPU bus. In one embodiment, the computer system may have multiple microprocessors coupled to each other via the CPU bus.

BRIEF DESCRIPTION OF THE DRAWINGS

Other objects and advantages of the invention will become apparent upon reading the following detailed description and upon reference to the accompanying drawings in which.

While the present invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF SEVERAL EMBODIMENTS

Figure 3:
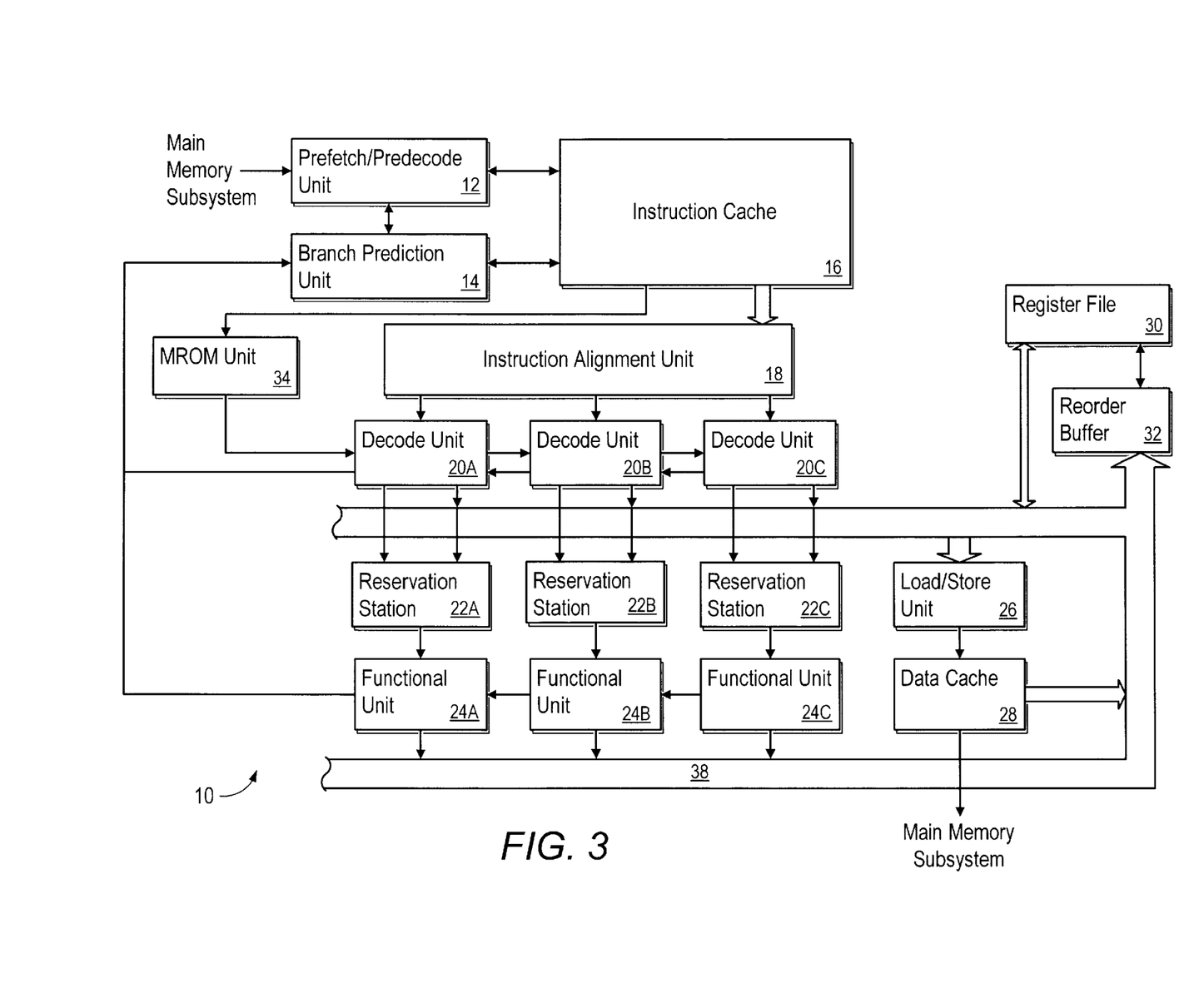
FIG. 3 is a block diagram illustrating one embodiment of a microprocessor configured to rapidly predecode large numbers of instruction bytes in parallel.

Turning now to FIG. 3, a block diagram of one embodiment of a microprocessor 10 that is configured to rapidly predecode instruction bytes in parallel is shown. Microprocessor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, and an MROM unit 34. Elements referred to herein with a particular reference number followed by a letter may be collectively referred to by the reference number alone. For example, decode units 20A–20C may be collectively referred to as decode units 20.

Prefetch/predecode unit 12 is coupled to receive instructions from a main memory subsystem (not shown), and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. Finally, MROM unit 34 is coupled to decode units 20.

Instruction cache 16 is a high speed cache memory provided to store instructions. Instructions are fetched from instruction cache 16 and dispatched to decode units 20. In one embodiment, instruction cache 16 is configured to store up to 64 kilobytes of instructions in a 4 way set associative structure having 32 byte lines (a byte comprises 8 binary bits). Alternatively, 2 way set associativity may be employed as well as any other desired associativity. Instruction cache 16 may additionally employ a way prediction scheme in order to speed access times to the instruction cache 16. Instead of accessing tags identifying each line of instructions and comparing the tags to the fetch address to select a way, instruction cache 16 predicts the way that is accessed. In this manner, the way is selected prior to accessing the instruction storage. The access time of instruction cache 16 may be similar to a direct-mapped cache. A tag comparison is performed and, if the way prediction is incorrect, the correct instructions are fetched and the incorrect instructions are discarded. It is noted that instruction cache 16 may be implemented as a fully associative, set associative, or direct mapped configuration.

Instructions are prefetched from main memory and stored into instruction cache 16 by prefetch/predecode unit 12. Instructions may be prefetched prior to the request thereof from instruction cache 16 in accordance with a prefetch scheme. A variety of prefetch schemes may be employed by prefetch/predecode unit 12. As prefetch/predecode unit 12 transfers instructions from main memory to instruction cache 16, prefetch/predecode unit 12 generates a number of predecode bits for each byte of the instructions, e.g., a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34. Still further, prefetch/predecode unit 12 may be configured to detect branch instructions and to store branch prediction information corresponding to the branch instructions into branch prediction unit 14.

One possible encoding of the predecode tags for microprocessor 10 is described below. In the exemplary encoding, if a particular byte is the first byte of an instruction, the start bit for that byte is set. Similarly, if the byte is the last byte of an instruction, the end bit for that byte is set. The third exemplary predecode bit is the functional bit, which distinguishes instructions which may be directly decoded by decode units 20, i.e., "fast path" instructions, and the remaining x86 instructions, i.e., MROM instructions. For fast path instructions, the functional bit may be set for each prefix byte included in the instruction, and cleared for other bytes. Alternatively, for MROM instructions the functional bit may be cleared for each prefix byte and set for other bytes. Thus, the type of instruction may be easily determined by examining the functional bit corresponding to the end byte. If that functional bit is clear, the instruction is a fast path instruction. Conversely, if that functional bit is set, the instruction is an MROM instruction. The opcode of an instruction may thereby be located in a fast past instruction as the byte associated with the first clear functional bit in the instruction. For example, a fast path instruction including two prefix bytes, a Mod R/M byte, and an immediate byte would have start, end, and functional bits as follows:

| | |
|---|---|
| Start bits | 10000 |
| End bits | 00001 |
| Functional bits | 11000 |

According to one particular embodiment, early identification of an instruction that includes a scale-index-base (SIB) byte is advantageous for MROM unit 34. For such an embodiment, if an instruction includes at least two bytes after the opcode byte, the functional bit for the Mod R/M byte indicates the presence of an SIB byte. If the functional bit for the Mod R/M byte is set, then an SIB byte is present. Alternatively, if the functional bit for the Mod RIM byte is clear, then an SIB byte is not present.

MROM instructions are instructions which are determined to be too complex for decode by decode units 20. MROM instructions are executed by invoking MROM unit 34. More specifically, when an MROM instruction is encountered, MROM unit 34 parses and translates the MROM instruction into a subset of defined fast path instructions to effectuate the desired operation. MROM unit 34 dispatches the subset of fast path instructions to decode units 20.

Before proceeding with a detailed description of the multiprocessor system configured to share predecode information, general aspects regarding exemplary superscalar microprocessor 10 of FIG. 2 will be described.

Microprocessor 10 may employ branch prediction in order to speculatively fetch instructions subsequent to conditional branch instructions. Branch prediction unit 14 is included to perform branch prediction operations. In one embodiment, up to two branch target addresses are stored with respect to each 16 byte portion of each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Because branch prediction unit 14 stores two targets per 16 byte portion of the cache line, some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the predecode data to align an instruction to each of decode units 20. In one embodiment, instruction alignment unit 18 aligns instructions from three sets of eight instruction bytes to decode units 20. Instructions are selected independently from each set of eight instruction bytes into preliminary issue positions. The preliminary issue positions are then merged to a set of aligned issue positions corresponding to decode units 20, such that the aligned issue positions contain the three instructions which are prior to other instructions within the preliminary issue positions in program order. Decode unit 20A receives an instruction which is prior to instructions concurrently received by decode units 20B and 20C (in program order). Similarly, decode unit 20B receives an instruction which is prior to the instruction concurrently received by decode unit 20C in program order.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e., instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to three pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. It is noted that a floating point unit (not shown) may also be employed to accommodate floating point operations. The floating point unit may be operated as a coprocessor, receiving instructions from MROM unit 34 and subsequently communicating with reorder buffer 32 to complete the instructions. Additionally, functional units 24 may be configured to perform address generation for load and store memory operations performed by load/store unit 26.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a load/store buffer having eight storage locations for data and address information for pending loads or stores. Decode units 20 arbitrate for access to the load/store unit 26. When the buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

In one embodiment, load/store unit 26 is configured to perform load memory operations speculatively. Store memory operations are performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 28 has a capacity of storing up to sixteen kilobytes of data in an eight way set associative structure. Similar to instruction cache 16, data cache 28 may employ a way prediction mechanism. It is understood that data cache 28 may be implemented in a variety of specific memory configurations, including a set associative configuration.

In one particular embodiment of microprocessor 10 employing the x86 microprocessor architecture, instruction cache 16 and data cache 28 are linearly addressed. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases. Additionally, the physical tag block may perform linear to physical address translation.

Details of Prefetch/Predecode Unit

Figure 4:
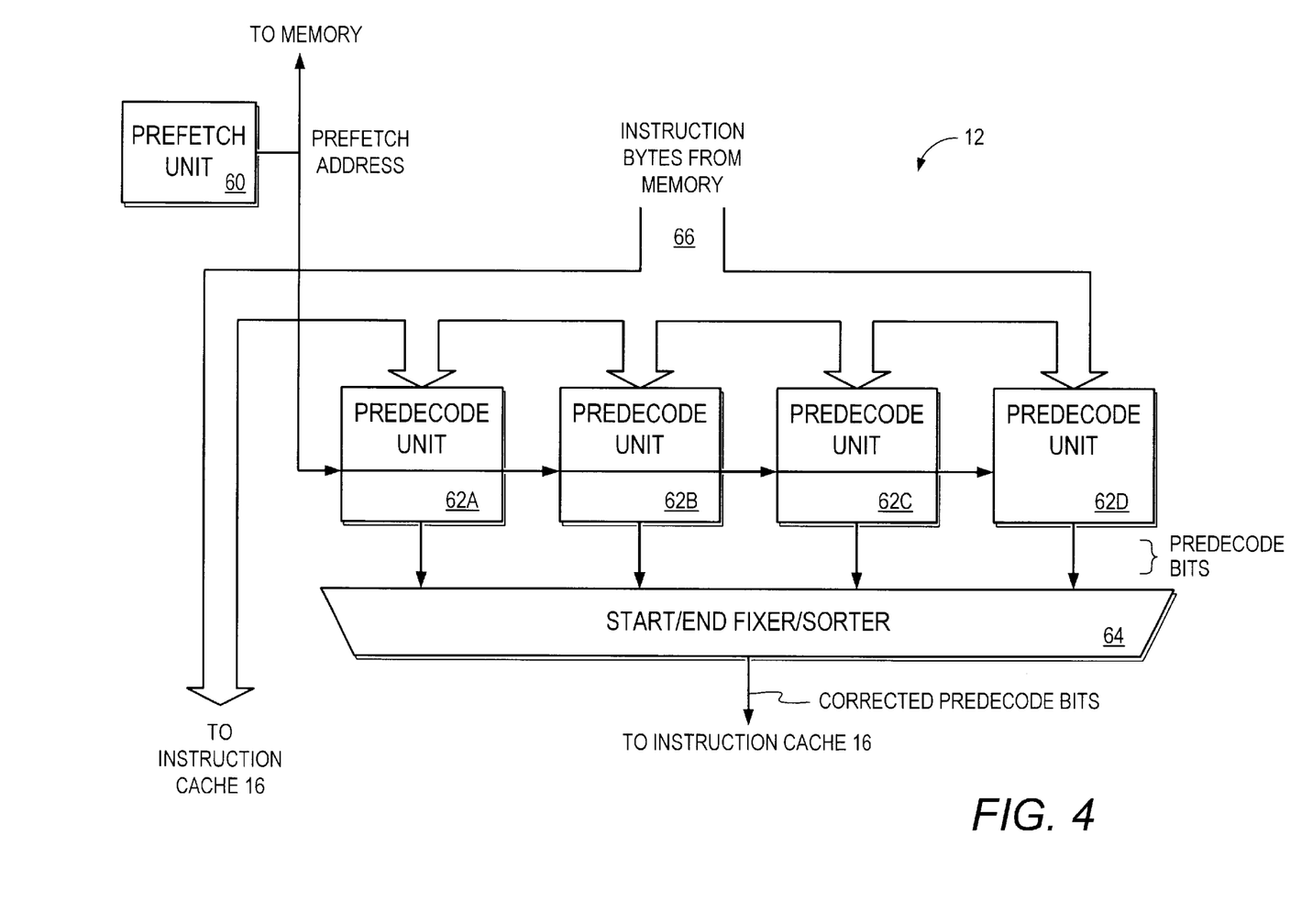
FIG. 4 is a block diagram illustrating details of one configuration of the microprocessor with a number of parallel predecode units and a predecode bit correction unit.

Turning now to FIG. 4, details of one embodiment of prefetch/predecode unit 12 are shown. As the figure illustrates, prefetch/predecode unit 12 may include a prefetch unit 60, a plurality of predecode units 62A–D, and a start/end fixer/sorter unit 64 (also referred to herein as a prefix bit correction unit or simply as a correction unit). Prefetch unit 60 is configured to output a prefetch address (e.g., from branch prediction unit 14) to the computer system's main memory subsystem. Several clock cycles later, the corresponding instruction bytes become available on bus 66. Bus 66 may be configured to route a first subset of the instruction bytes to predecode unit 62A, a second subset of the instruction bytes to predecode unit 62B, a third subset of the instruction bytes to predecode unit 62C, and a fourth subset of instruction bytes to predecode unit 64D. In some embodiments, this may be accomplished through the use of buffers (e.g., FIFOs) and routing logic (not shown). Prefetch unit 60 may also be configured to route the prefetch address information to one or more of the predecode units 62A–D or routing logic on bus 66. To simplify the necessary hardware, many x86 microprocessors fill entire lines in the instruction cache at once, with the restriction that each cache line can only be mapped to aligned blocks of main memory (e.g., 128-bit blocks). Aligned 128-bit blocks begin at addresses that have the lower four bits clear. Thus, by also routing the prefetch address to the predecoders, the predecoders may use the offset portion of the address to predecode the instruction bytes regardless of whether the first complete instruction begins at the start of the aligned block or in the middle of the aligned block.

Figure 5:
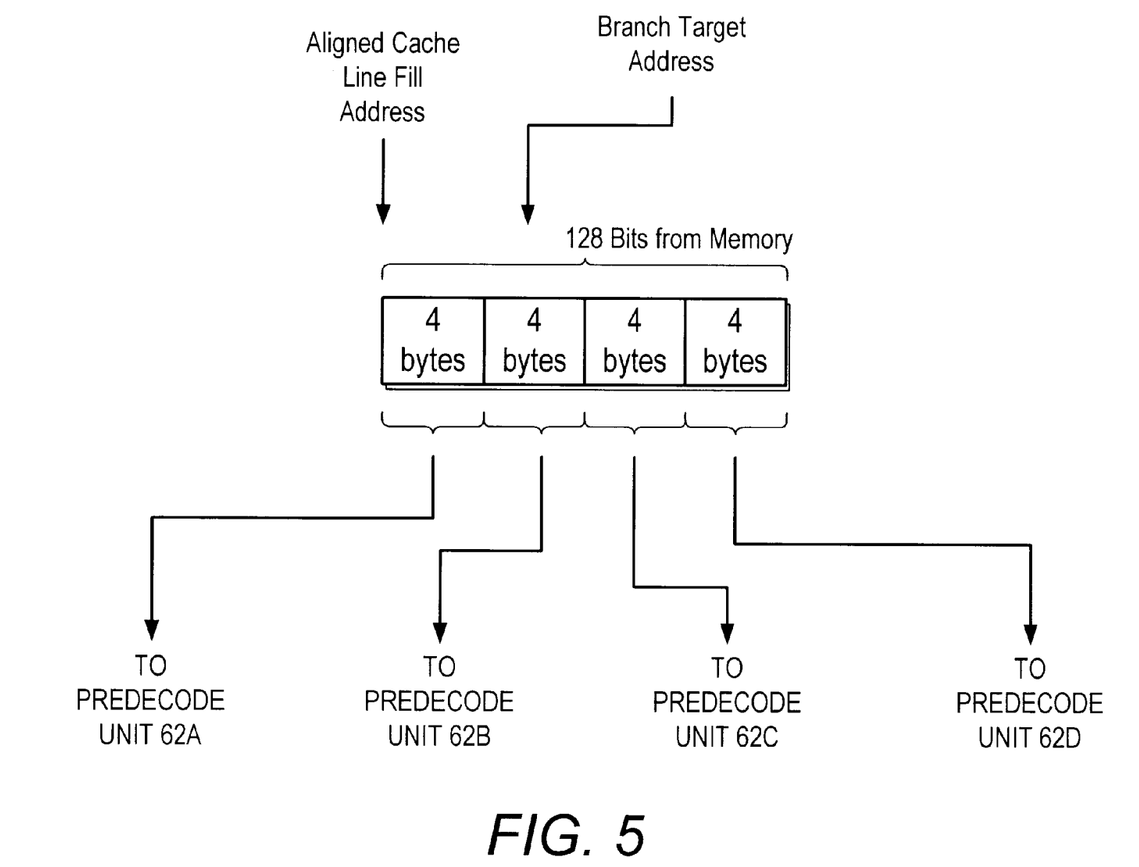
FIG. 5 is a block diagram illustrating details of how the instruction bytes are routed to the parallel predecode units.

An example of a cache line fill is shown in FIG. 5. Bus 66 and its corresponding routing logic may be configured to evenly divide the fetched cache line into subsets (e.g., 4 byte subsets) that are routed to the predecode units 62A–62D. As shown in the figure, the aligned cache fill address need not correspond to the address of the first instruction within the block of bytes from memory. In this case the first complete instruction (indicated as a branch target address in the figure) occurs six bytes from the beginning of the aligned block. Regardless of where the instructions actually begin and end, bus 66 is configured to divide the block into equal subsets and route each subset to a different predecode unit.

Figure 6:
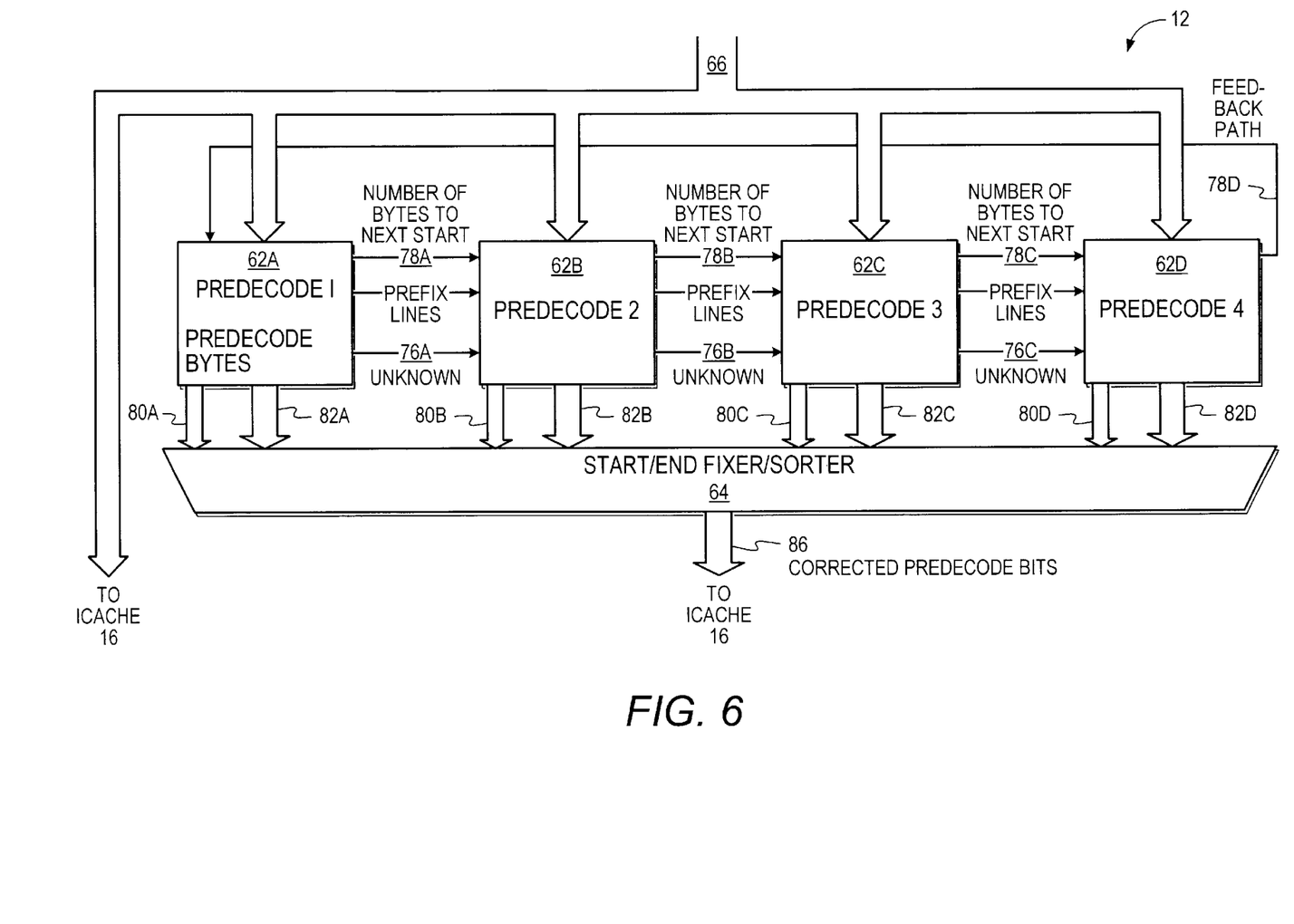
FIG. 6 is a block diagram showing one embodiment of the predecode units and one possible configuration of the interconnections between them.

FIG. 6 illustrates another embodiment of prefetch/predecode unit 12. In this embodiment, each predecode unit 62A–D is configured to convey a count value 78A–D to the next predecode unit. Count values 78A–D are each indicative of the number of instruction bytes remaining in an instruction that extends beyond the particular subset being predecoded. For example, if each predecode unit receives four bytes, and the first instruction is six bytes long and begins with the first byte of the aligned block, then the first predecode unit would set count value 78A equal to two. This configuration may advantageously allow each predecode unit to predecode instructions that extend across subset boundaries. Similarly, each predecode unit may be further configured to generate an unknown signal 76A–C indicates that the predecode unit has been unable to predecode the instruction bytes is has received. For example, if the bytes received by predecode unit 62A were invalid opcodes, then predecode unit 62A may assert unknown signal 76A to indicate that predecode unit 62B should independently attempt to predecode its instruction bytes without regard to the results of predecode unit 62A.

Each predecode unit 62-D is configured to route the predecode bits it calculates and count values 78A–78D to correction unit 64. Correction unit 64 may be configured to verify the predecode bits based on the predicted next instruction address (e.g., a branch target address generated by branch prediction unit 14). In some embodiments, correction unit 64 may advantageously be configured to perform the verification and error correction within a single clock cycle. In other embodiments, verification takes one clock cycle, but error correction of incorrect predecode bit may take one or more additional clock cycles. During these clock cycles, additional instruction bytes received from memory may be buffered (e.g. in a first-in first-out memory coupled between predecode unit 12 and main system memory.

Advantageously, in some embodiments predecode units 62A–D and correction unit 64 may be configured to rapidly predecode entire cache lines with two clock cycles latency (i.e., one clock cycle for predecoding and one clock cycle for verification and correction). In some embodiments, it may possible to reposition predecode units 62A–D and correction unit 64 to process data read from the instruction cache in lieu of predecoding the data and then storing it into the instruction cache. This may advantageously reduce the amount of storage needed in the instruction cache for predecode bits.

Other embodiments are possible and contemplated. U.S. patent application No. 09/184,750 filed on Nov. 2, 1998, now U.S. Pat. No. 6,260,134 entitled "Improved Instruction Decoding Using a Parallel Decode Algorithm", by Zuraski, et al., discloses additional information regarding parallel decoding and is hereby incorporated by reference in its entirety.

Exemplary Computer System

Figure 7:
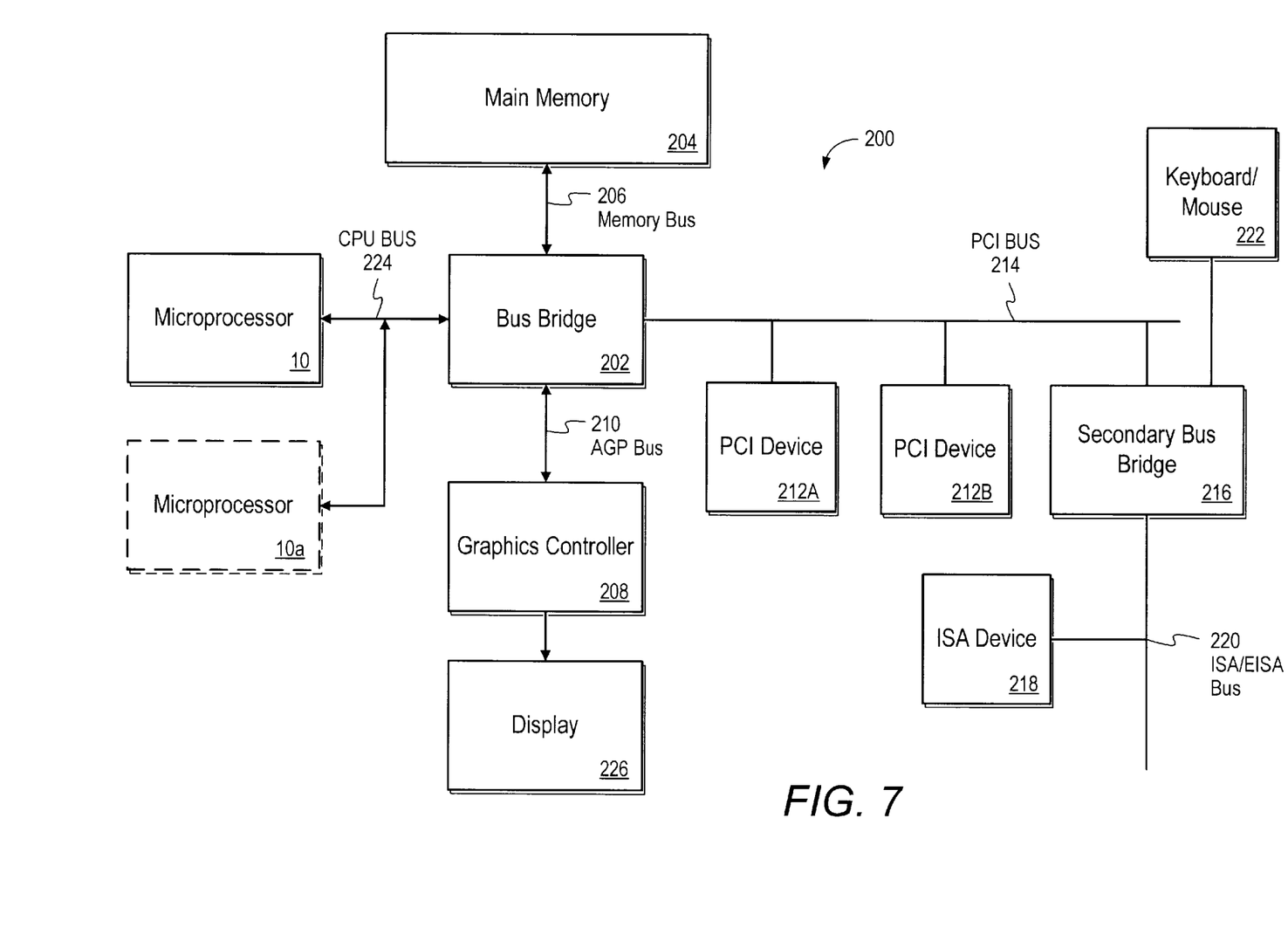
FIG. 7 is a block diagram of one embodiment of a computer system configured to use the microprocessor from FIG. 3.

Turning now to FIG. 7, a block diagram of one embodiment of a computer system 200 configured to use microprocessor 10 is disclosed. Computer system 200 is coupled to a variety of system components through a bus bridge 202 as shown. Other embodiments are possible and contemplated. In the depicted system, a main memory 204 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Microprocessor 10 is coupled to bus bridge 202 through a CPU bus 224.

Bus bridge 202 provides an interface between microprocessor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. For example, in one embodiment, secondary bus bridge 216 includes a master PCI arbiter (not shown) for arbitrating ownership of PCI bus 214. An input/output controller (not shown), either external from or integrated with secondary bus bridge 216, may also be included within computer system 200 to provide operational support for a keyboard and mouse 222 and for various serial and parallel ports (e.g., a modem port for connecting a modem), as desired. An external cache unit (not shown) may further be coupled to CPU bus 224 between microprocessor 10 and bus bridge 202 in other embodiments. Alternatively, the external cache may be coupled to bus bridge 202 and cache control logic for the external cache may be integrated into bus bridge 202.

Main memory 204 is a memory in which application programs are stored and from which microprocessor 10 primarily executes. A suitable main memory 204 comprises DRAM (Dynamic Random Access Memory), and preferably a plurality of banks of SDRAM (Synchronous DRAM).

PCI devices 212A–212B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 200 may be a multiprocessing computer system including additional microprocessors (e.g. microprocessor 10a shown as an optional component of computer system 200). Microprocessor 10a may be similar to microprocessor 10. More particularly, microprocessor 10a may be an identical copy of microprocessor 10.

Microprocessor 10a may share CPU bus 224 with microprocessor 10 (as shown in FIG. 5) or may be connected to bus bridge 202 via an independent bus.

A method and apparatus for predecoding variable-length instructions has been disclosed. While the invention has been particularly shown and described with reference to preferred embodiments thereof, it will be understood by those skilled in the art that various changes in form and details may be made therein without departing form the spirit and scope of the invention.

What is claimed is:

1. A microprocessor comprising:
   a prefetch unit configured to receive a plurality of instruction bytes from a main memory subsystem in response to outputting a prefetch address;
   a plurality of predecode units coupled to receive a prefetch address and a plurality of instruction bytes from the prefetch unit, wherein each predecode unit is configured to operate on a plurality of instruction bytes independently and in parallel to generate one or more predecode bits per instruction byte; and
   a predecode bit correction unit coupled to receive the prefetch address, the instructions bytes from the prefetch unit, and the predecode bits from the plurality of predecode units.

2. The microprocessor as recited in claim 1, wherein the predecode bits include start bits and end bits.

3. The microprocessor as recited in claim 2, wherein the predecode bit correction unit is configured to validate the start bits and end bits.

4. The microprocessor as recited in claim 2, wherein the predecode bit correction unit is further configured to correct the start bits and end bits that are not valid based on the prefetch address and the instruction bytes.

5. The microprocessor as recited in claim 1, wherein the predecode units each predecode the instructions bytes received in one clock cycle.

6. The microprocessor as recited in claim 2, wherein the predecode bit correction unit is configured to validate the start bits and end bits and correct the start bits and end bits that are not valid in one clock cycle.

7. The microprocessor as recited in claim 1, wherein the predecode units are each further configured to output a count value to predecode bit correction unit, wherein each count value is indicative of the number of bytes in an instruction that extends beyond the plurality of instruction bytes being decoded by the particular predecode unit.

8. The microprocessor as recited in claim 1, wherein the predecode units are coupled in series, and wherein each predecode unit is configured to pass the count value to the next predecode unit in series.

9. The microprocessor as recited in claim 1, wherein the predecode units are each configured to predecode four bytes per clock cycle, and wherein said microprocessor comprises four predecode units.

10. A method for predecoding instructions comprising:
    reading a plurality of instruction bytes from a main memory subsystem;
    dividing said plurality of instruction bytes into a plurality of subsets;
    distributing said subsets among a plurality of predecode units;
    processing each subset in the predecode units by:
      generating at least one predecode bit for each instruction byte;
      outputting the predecode bits to a predecode bit correction unit;
    verifying the accuracy of the predecode bits in the predecode bit correction unit; and
    correcting any predecode bits that are incorrect.

11. The method as recited in claim 10, further comprising routing the fetch address to the predecode units and the predecode bit correction unit.

12. The method as recited in claim 10, further comprising generating a count value in each predecode unit, wherein the count value is indicative of the number of bytes in an instruction that extend beyond the particular subset being predecoded in each particular subset.

13. The method as recited in claim 10, further comprising conveying the count values to the predecode bit correction unit, wherein the predecode bit correction unit is configured to correct any erroneous predecode bits using the count values.

14. The method as recited in claim 10, wherein said generating at least one predecode bit includes generating a start bit for each instruction byte.

15. The method as recited in claim 10, wherein said generating at least one predecode bit includes generating an end bit for each instruction byte.

16. The method as recited in claim 10, wherein said generating at least one predecode bit includes generating a start bit and an end bit for each instruction byte.

17. A computer system comprising:
    a first microprocessor;
    a CPU bus coupled to said first microprocessor; and
    a modem coupled to said CPU bus,
    wherein said first microprocessor comprises:
      a prefetch unit configured to receive a plurality of instruction bytes from a main memory subsystem in response to outputting a prefetch address;
      a plurality of predecode units coupled to receive a prefetch address and a plurality of instruction bytes from the prefetch unit, wherein each predecode unit is configured to operate on a plurality of instruction bytes independently and in parallel to generate one or more predecode bits per instruction byte; and
      a predecode bit correction unit coupled to receive the prefetch address, the instructions bytes from the prefetch unit, and the predecode bits from the plurality of predecode units.

18. The computer system are recited in claim 17, further comprising a second microprocessor coupled to said first microprocessor via said CPU bus.

19. The microprocessor as recited in claim 17, wherein the predecode bits include start bits and end bits.

20. The microprocessor as recited in claim 18, wherein the predecode bit correction unit is configured to validate the start bits and end bits and correct the start bits and end bits that are not valid in one clock cycle.

* * * * *